(12) United States Patent
Luebbers (10) Patent No.: US 8,132,783 B2
(45) Date of Patent: Mar. 13, 2012

(54) DYNAMIC ORIFICE VALVE APPARATUS AND METHOD

(75) Inventor: Paul Luebbers, Dunlap, IL (US)

(73) Assignee: Lumec Control Products, Inc, Peoria, IL (US)

( * ) Notice: Subject to any disclaimer, the term of this patent is extended or adjusted under 35 U.S.C. 154(b) by 1146 days.

(21) Appl. No.: 11/854,224

(22) Filed: Sep. 12, 2007

(65) Prior Publication Data

US 2009/0065081 A1 Mar. 12, 2009

(51) Int. Cl.
*F16K 3/00* (2006.01)
(52) U.S. Cl. .......................................... 251/212; 138/45
(58) Field of Classification Search ................. 251/212; 137/487, 468; 138/44–46
See application file for complete search history.

(56) References Cited

U.S. PATENT DOCUMENTS

| | | | |
|---|---|---|---|
| 1,595,300 A * | 8/1926 | Halloran | 251/212 |
| 3,175,765 A | 3/1965 | Stranak | |
| 3,787,022 A * | 1/1974 | Wilcox | 251/212 |
| 4,023,280 A | 5/1977 | Schora et al. | |
| 4,026,321 A * | 5/1977 | Kahoe et al. | 137/487 |
| 4,040,403 A | 8/1977 | Rose et al. | |
| 4,094,492 A | 6/1978 | Beeman et al. | |
| 4,232,595 A * | 11/1980 | Cox | 251/212 |
| 4,353,500 A * | 10/1982 | Brown | 236/34.5 |
| 4,383,550 A | 5/1983 | Sotokazu | |
| 4,790,194 A | 12/1988 | Bellows et al. | |
| 5,238,398 A | 8/1993 | Harris | |
| 5,331,995 A | 7/1994 | Westfall et al. | |
| 5,449,141 A | 9/1995 | Gillett et al. | |
| 5,829,464 A | 11/1998 | Aalto et al. | |
| 5,938,175 A | 8/1999 | Young et al. | |
| 5,975,493 A | 11/1999 | Ellingson et al. | |
| 6,221,091 B1 | 4/2001 | Khosravi | |
| 6,375,155 B1 | 4/2002 | Janssens | |
| 6,439,944 B1 | 8/2002 | La Fata | |

(Continued)

FOREIGN PATENT DOCUMENTS

WO 9728390 A1 8/1997

(Continued)

OTHER PUBLICATIONS

International Search Report, PCT/US2008/074300 (Nov. 10, 2008).

*Primary Examiner* — John Fristoe, Jr.
*Assistant Examiner* — Andrew J Rost
(74) *Attorney, Agent, or Firm* — Barnes & Thornburg LLP (57) ABSTRACT

In a fluid transmission line, a valve comprising a housing that establishes a lumen for transmission of a fluid through said valve; a drive mechanism and a drive gear mounted in said housing to be selectively driven in a first or second rotational direction by said drive mechanism. The drive gear has a central throughhole and a plurality of pins around the central throughhole. A plurality of leaves are pivotally mounted on the pins, and oriented to extend radially inward into said central throughhole. A fixed extension has an annular aspect disposed in the drive gear, and has a plurality of engagement members disposed to operatively engage one of said leaves. The engagement members bias the leaves to close an orifice when said drive gear rotates in said first direction and to open the orifice when said drive gear rotates in said second direction. Each of the leaves maintains a substantially sealing engagement with each adjacent leaf throughout a range of motion of the leaves.

25 Claims, 12 Drawing Sheets

U.S. PATENT DOCUMENTS

| | | |
|---|---|---|
| 6,588,455 B1 | 7/2003 | Welfare |
| 6,872,013 B2 * | 3/2005 | Guy .............................. 396/508 |
| 6,896,240 B2 | 5/2005 | Wijaya |
| 7,255,012 B2 | 8/2007 | Hedtke |
| 7,666,180 B2 * | 2/2010 | Holsten et al. .................... 606/1 |

FOREIGN PATENT DOCUMENTS

| | | |
|---|---|---|
| WO | 9947839 A1 | 9/1999 |
| WO | 2006060185 A1 | 6/2006 |
| WO | 2009035845 A1 | 3/2009 |

* cited by examiner

SECTION A-A

DYNAMIC ORIFICE VALVE APPARATUS AND METHOD

CROSS-REFERENCE TO RELATED APPLICATIONS

None

BACKGROUND OF THE INVENTION

1. Field of the Invention

The field of this invention is in valves for fluid and gas flow, particularly natural gas.

2. Related Art

The flow of the fluids and gases being piped through lines is typically controlled with valves. The valves of course control flow through a pipe by obstructing the pipe in one form or another. In the prior art, the form of obstruction is asymmetrical. For example if a simple screw or needle type valve mechanically advances a gate or needle into a cylinder from one side. Even well-known butterfly valves are symmetrical in one direction, but asymmetrical in another, in that half of the butterfly disk advances towards the source of flow while the other half recedes away from it.

The effect on the flow of the fluid gases that is created by the simple mechanical devices is also asymmetrical, irregular and unpredictable. Generally, it is desirable to have more symmetrical fluid flow throughout the range of constriction that a valve is designed to achieve. This promotes a more rapid return to laminar flow, reduces friction, avoids obstruction from contaminants, reduces back pressure and enables more accurate flow rate and pressure control. More particularly, in some applications, particularly pressurized applications for gas, there is a desirability and need for a symmetrical and therefore more precise constriction of gas flow in order to promote predictably and accuracy of use of the gas thereby making its use more economical across all ranges of pressure and volume to be executed by the valve.

Most particularly, some applications of natural gas use, for example, heat treatment of production material, most especially heat treatment of ferrous metals, requires an optimally precise control of gas flow. More particularly still, a gas flow is combined with gas or air in order to achieve a precise control of how lean or rich will be the output of the gas line for combustion in the heat treating chamber. Precise control of how lean or rich the gas output into the heating chamber is important because the chemical and rheological properties of the metal being treated are sensitive to the chemical atmosphere in the chamber which in turn is dependent upon the gas/air mixture received from the gas line.

Figure 1:
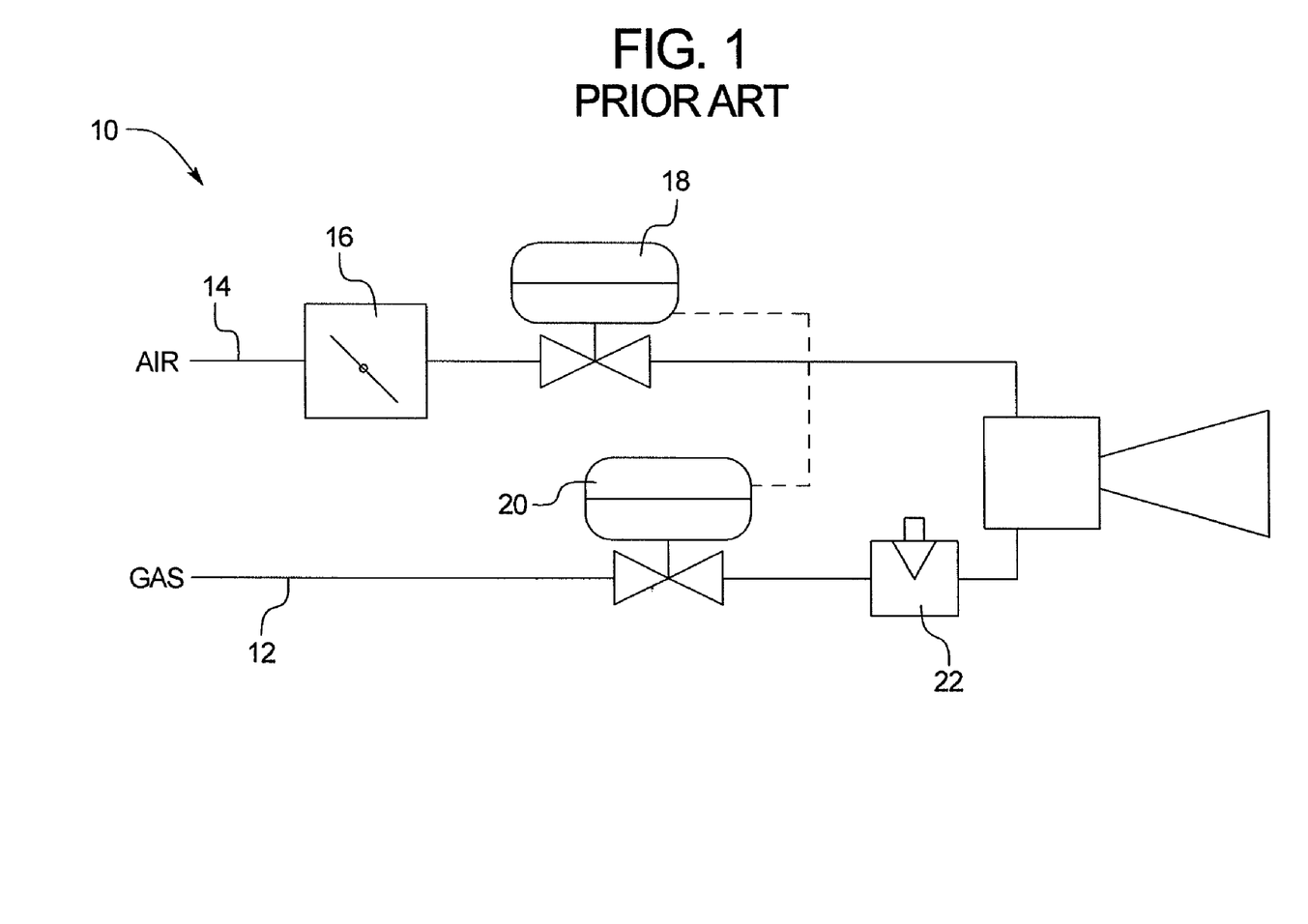
FIG. 1 is a schematic side view of a prior art valve system.

FIG. 1, depicting a prior art natural gas burner assembly (10) shows the natural gas line (12) in combination with an air or oxygen line (14). The air line (14) is controlled by a butterfly valve (16). Downstream of the butterfly valve, a flow sensor control (18) controls an impulse valve (20) in the gas line (10). If any fine adjustment is needed, a needle valve (22) is fitted downstream of gas line (10). This is an example of an unintegrated assembly created from separate components. A disadvantage of such an assembly is that the final output does not vary proportionally with adjustment of controls. In prior art valves, such as valve 16 in FIG. 1, the amount of flow allowed to pass varies with opening in an unpredictable fashion that is not continuously proportional to the progressive opening or closing of the valve. The volume, pressure and turbulence of flow are not mathematically predictable or precisely controllable. Accordingly, in the prior art application illustrated, the mixture of the gas/air combination is also unpredictable and poorly controlled. The volume of flow as a function of the percentage of opening of a valve is complex, difficult to model, variable over time and sometimes discontinuous.

There is a need in the art for a valve that opens and closes in a manner that will increase or decrease flow of the fluid or gas to the valve in a mathematically predictable, controlled fashion that is proportionate to the percentage of the opening or closing of the valve. There is a continuing need in the art for durability, efficiency, integration of components, type of sealing to prevent leaks, economy and durability.

SUMMARY OF THE INVENTION

In a fluid transmission line, a valve comprises a housing that establishes a lumen having an axial length for transmission of a fluid through said valve; a drive mechanism; a drive gear being mounted in said housing to be selectively driven in a first or second rotational direction by said drive mechanism, said drive gear having a central throughhole coaxial with an axis of said valve; a plurality of pins circumferentially spaced around said central throughhole of said drive gear; a plurality of leaves, each being pivotally mounted on one of said plurality of pins, and oriented to extend radially inward into said central throughhole; a fixed extension having an annular aspect disposed in close cooperation with said drive gear, and said fixed extension having a plurality of engagement members disposed to operatively engage one of said leaves at a position intermediate to said pivotal pin mount of each of said leaves and to said axis of said valve; said engagement members biasing said leaves to close an orifice when said drive gear rotates in said first direction and to open said orifice when said drive gear rotates in said second direction; and each of said leaves maintaining a substantially sealing engagement with each adjacent leaf throughout a range of motion of said plurality of leaves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2A:
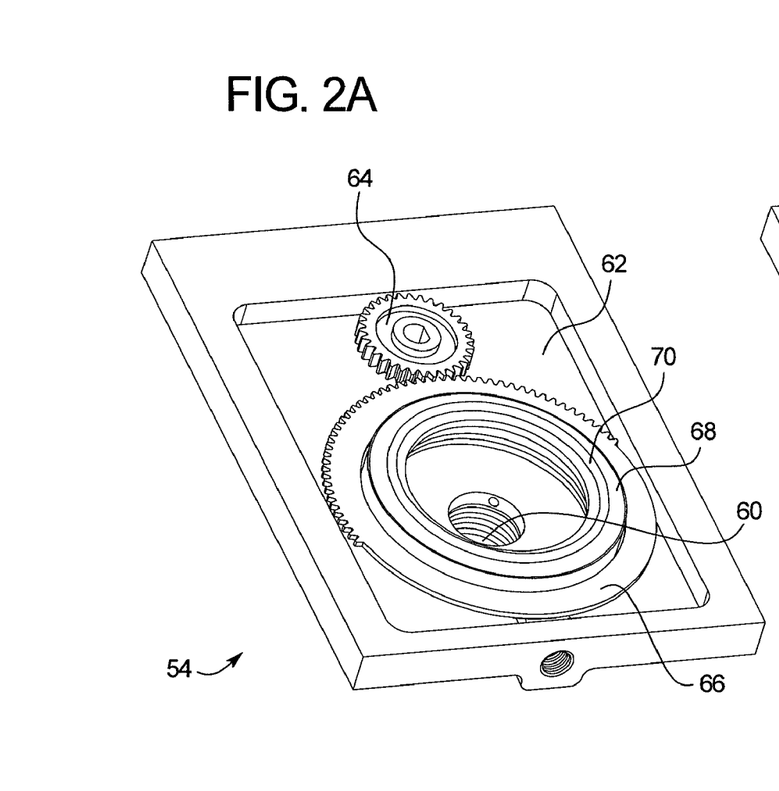
FIG. 2A is an interior view of one side of a housing.
Figure 2B:
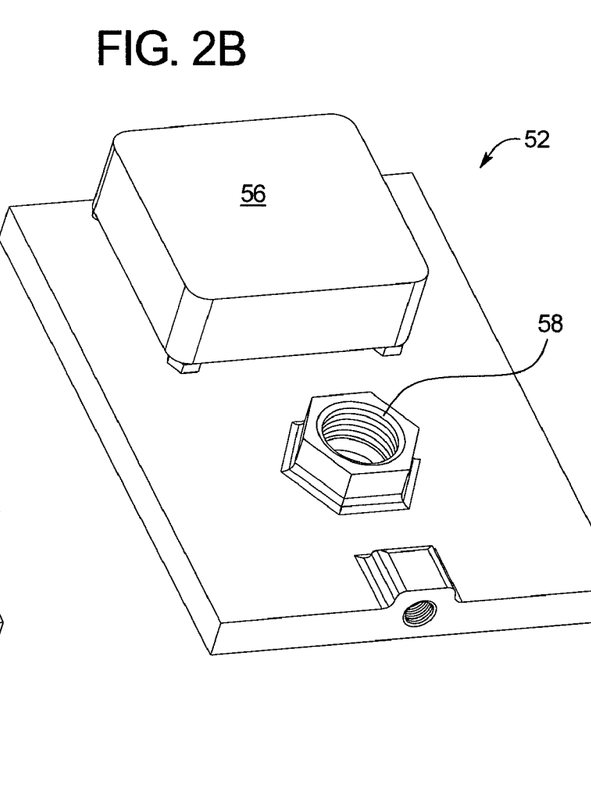
FIG. 2B is an exterior view of another side of a housing.

FIGS. 2A and 2B depict a housing comprised of a housing top 52 and bottom 54 portion which house the valve of present invention. Housing top 52 includes a seat 56 for a drive motor. Housing top 52 and bottom 54 include through holes 58 and 60, respectively, for mounting a pipe or line through which a fluid or gas may be directed. The line may be a natural gas line. In the depicted embodiment, a recess 62 is shown in the housing bottom 54 for containing the hereinafter described components. The valve housing consists of two plates. Each plate has a hexagonal pipe-fitting boss on one side, and is threaded with a standard NPT thread. The opposite side of each housing contains features for the alignment and mounting of the internal valve components, namely the iris assembly, the drivetrain gears, and the sealing mechanisms. There are features on the inside of one of the housing plates which allow mechanical fastening of a motor/electrical control interface. The two housing plates mechanically fasten together.

A motor (not shown) housed in recess 62 will drive a drivetrain, which in the depicted embodiment is a drive gear 64 which in turn is drivingly engaged with a main gear 66. Assembled coaxially with main gear 66 and through holes 58 and 60, is a bushing 68 having an annular extension. In the depicted embodiment, the bushing has a seal 70, an O-ring is depicted, for sealing against a flush face of housing top 52. In the embodiment depicted in FIG. 2, main gear 66 has a sufficient number of teeth to correspond with the full range of motion for the valve leaves, described below. The opposite face of the gear has a protruding boss. The gear has a through-hole through the center. The boss is positioned within a counterbore in the housing, which allows the gear to freely rotate.

Figure 3A:
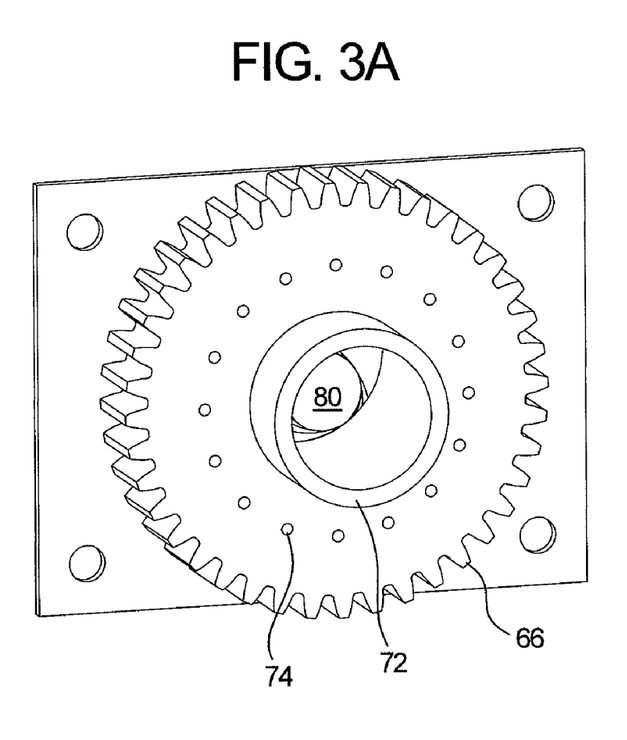
FIG. 3A is an isometric view of the main gear of the valve.
Figure 3B:
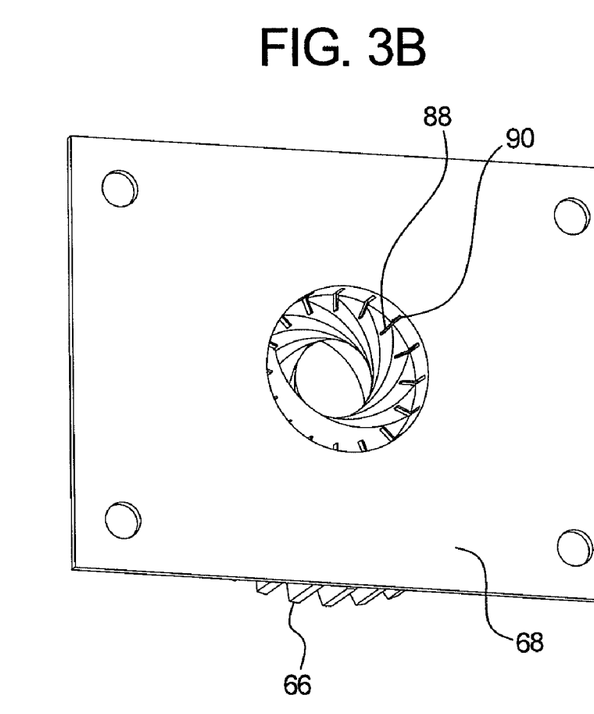
FIG. 3B is an opposing isometric view of the main gear of the valve.

FIGS. 3A and 3B are close-ups of the main or iris gear 66. In the embodiment depicted in FIGS. 3A and 3B, the entire circumference of main gear 66 is toothed. FIG. 3A depicts an upstream facing surface of main gear 66. This surface includes a boss 72 dimensioned to seat in sealing fluid communication with through hole 60 in housing bottom 54. Also depicted in 3A are pin holes 74.

Figure 5:
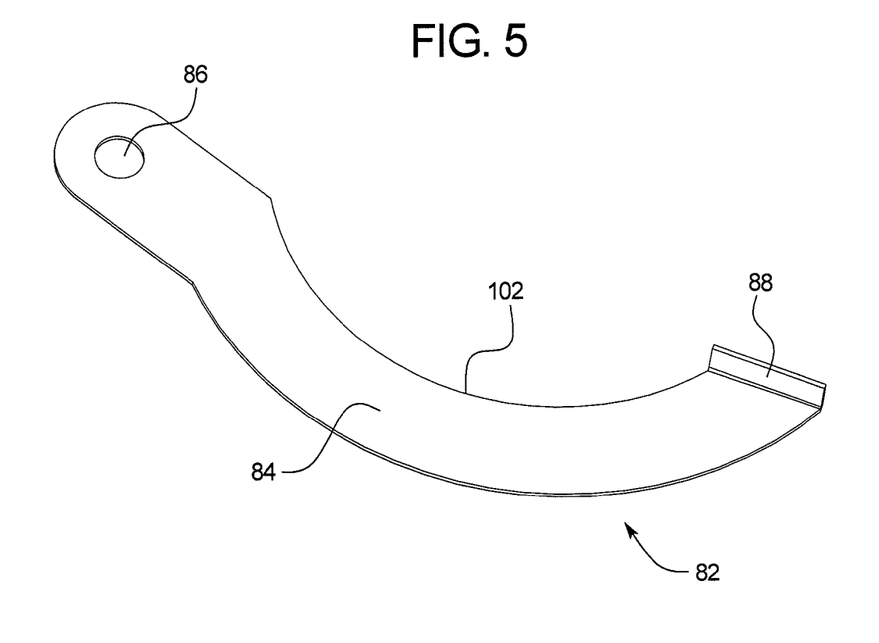
FIG. 5 is an isometric view of a single leaf of the iris.

As seen in FIGS. 3A and 3B a valve orifice 80 is defined by a plurality of leaves. An individual leaf 82 is depicted in FIG. 5. In the depicted embodiment there are 16 leaves. Each of the depicted leaves 82 has a substantially flat, curvilinear portion. A first end of the leaf 82 has a through hole 86 for receiving a pin for mounting the leaf 82 under the main gear 66 in a pivoting manner. The second end of leaf 82 terminates in a fin or flange 88 (FIG. 5). In the depicted embodiment, the fin 88 is substantially perpendicular to the plane of the curvilinear portion 84. It is within the scope of the present invention that the flange 88 may be at an angle to the curvilinear portion 84 of the leaf within a range of substantially about 90° to substantially about 135°. Those of skill in the art will appreciate that the use of a flange allows for overlapping leaves, including multiple overlaps, that is, more than two leaves overlapping one another relative to the longitudinal axis of the valve. This feature, independently or in combination with the integral fabrication of the gear 66, allows the design to be used in high pressure applications as well as other more abusive environmental conditions, such as high temperature or corrosive fluid flow, and promotes tighter sealing. Portions of the leaves, such as curvilinear portion 84, may be flared, twisted, torqued or otherwise non-planar to further promote a sealing engagement with neighboring leaves.

The leaves may be made from two different materials, and arranged so that each leaf is a different material than the adjacent leaf. Physical forces, such as magnetism, or an integral torsion in each leaf, bond the leaves together while allowing them to slide relative to each other.

Figure 4:
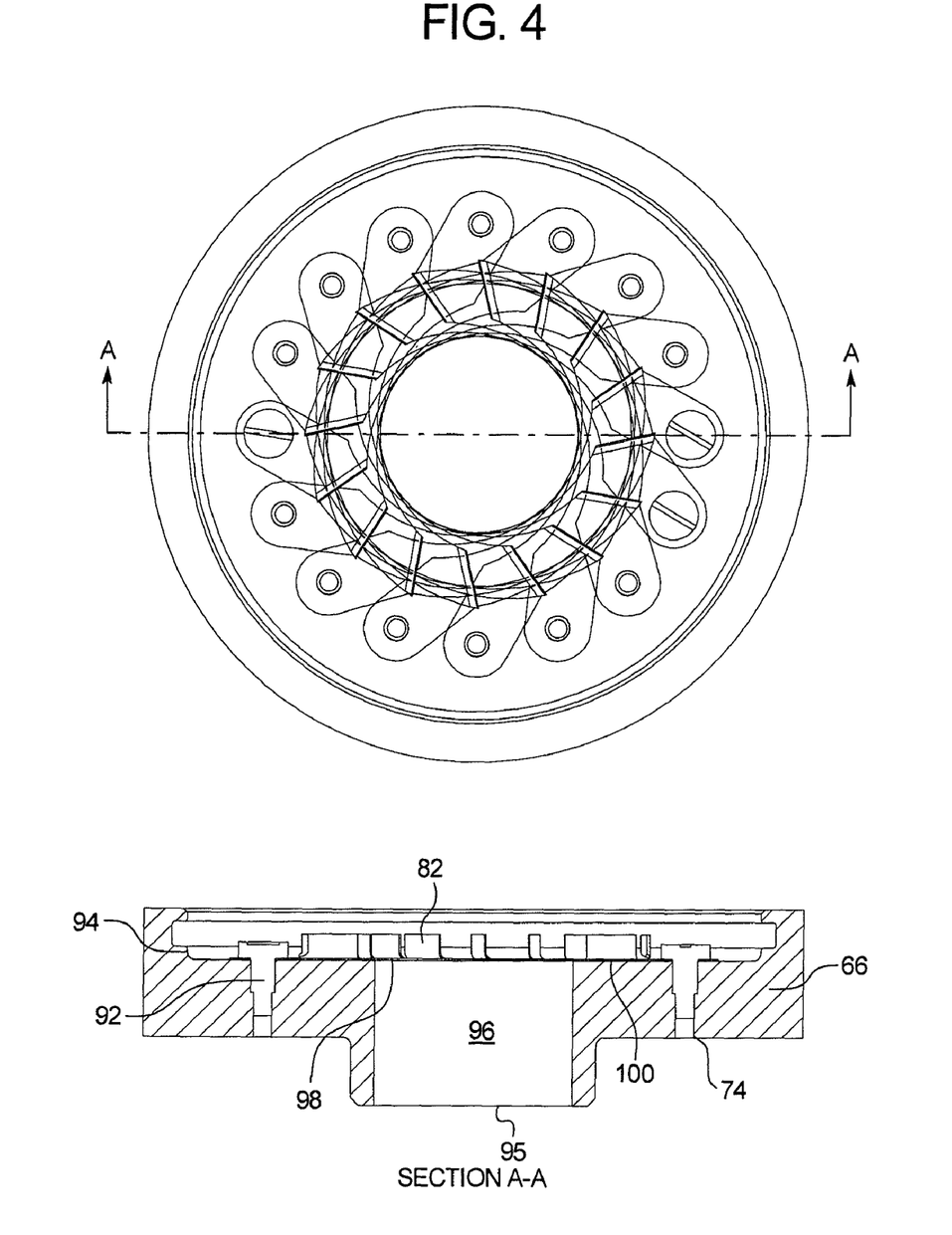
FIG. 4 is a cutaway side view of the main gear and iris of the valve.

FIG. 4 is a cutaway side view of main gear 66 including a through hole 96 which is centered on valve axis 95 and define a part of a lumen through which a fluid material would flow. Also depicted are pin holes 74 and pins 92 installed therein. The pins are long enough in axial direction to also anchor leaves 82 in their engagement with pin holes 86. At least a portion of a lower surface 98 of each leaf abuts an upper surface 100 of a recess 94 in main gear 66. This abutment is sufficient to maintain a seal. The seal is in turn sufficient to maintain itself against the anticipated use of the installed device. Fixation of leaf 82 to main gear 66 with pin 92 may be adjusted for an appropriate tractive force to be applied against leaf 82 by pin 92 in order to maintain sealing abutment.

In assembly, each leaf 82 is pinned to main gear 66. Each leaf thereafter has fin 88 projecting axially, downstream in the depicted embodiment. Thereafter, a bushing or extension 68 is installed on top of the plurality of leaves 82 such that each axially projecting fin 88 is received into each of a plurality of slots 90 in bushing 68. The flanges of the leaves are guided within slots in the bushing or extension 68. This guide extension 68 fixedly locks into the housing to prevent rotation. A protruding ring has the thin slots cut for the leaf flanges to engage. Another ring may provide a sealing surface.

In the depicted embodiment, when assembled, each pin is substantially equidistant radially to the center axis 95 of the through hole 96 and orifice 80 of the valve. Correspondingly, slots 90 are also substantially equidistant radially, and substantially equally spaced circumferentially in the depicted embodiment. Each fin is also substantially linear in the depicted embodiment. The assembled components of leaves 82, bushings 68 and main gear 66 are thereafter further installed with O-ring 70 into recess 62 of housing bottom 54. The main gear 66 engages with drive gear 64. Bushing 68 is fixedly attached to housing top 52 by means of a key and slot, boss and detent, snap fit, screws or otherwise. The motor and housing top 52 assembly is thereafter installed over housing bottom 54 thereby encapsulating the components.

The drive mechanism may consist of an electric gear motor, either electrically powered, capable of being driven in both the forward and reverse directions. The motor has two output shafts. The primary output shaft penetrates one of the housing plates to drive the iris diaphragm through the drivetrain. The secondary output shaft is used for valve position sensing. The valve may also be manually adjustable, through the use of a lever, worm screw, etc.

In operation, a drive motor turns drive gear 64 in response to either automatic control or user selection. Drive gear 64 through its meshing engagement with main gear 66 turns main gear 66. Bushing 68 does not rotate. As drive gear 66 rotates, the second inner end of each leaf 82 is held fixed against circumferential displacement by engagement of the fin 88 with its corresponding slot 90 of fixed bushing 68. As the main gear 66 rotates, it circumferentially turns the outer end of each leaf 82. Each leaf 82 rotates around its pin hole 86. Accordingly, traction on each leaf 82 through pin 92 by main gear 66 causes each leaf to advance radially inward. As main gear 66 is driven in a first direction, each of the plurality of leaves moves inward. That is to say, an inside edge 102 each leaf advances in a manner reducing the distance between the inner edge 102 of the leaf and a center axis of orifice 80. Accordingly, orifice 80 closes.

To open the orifice 80 and allow a larger volume of fluid or gas to pass therethrough, main gear 66 is driven in an opposite direction. Each leaf is thereby driven by its pin hole 86 against the slot 90. Engagement of each fin 88 against slot 90 causes the leaf to move radially outward from the center axis of the orifice 80, thereby opening it. Accordingly, a dual polarity motor may provide driving force in each of two directions in order to selectively open and close the orifice 80 through which fluid or gas flows.

In the depicted embodiment, the 16 leaves form an orifice that is substantially circular. The iris type configuration depicted provides for the orifice to remain symmetrical, and as depicted substantially centered on the valve axis throughout variations in its size or variations in the flow volume through it. As such, the valve provides a mathematically predictable proportion between orifice size and flow volume. Because the orifice is centered on the lumen defined by the housing and geometrically symmetrical, the flow of fluid or gas through it is much more directly proportional to the opening or closing of the orifice 80 than prior art valves. Accordingly, a more precise control of flow may be achieved. Laminar flow of fluid is re-established immediately after the orifice and may be established within the lumen of the valve itself, minimizing turbulence as the fluid exits the valve.

Figure 6:
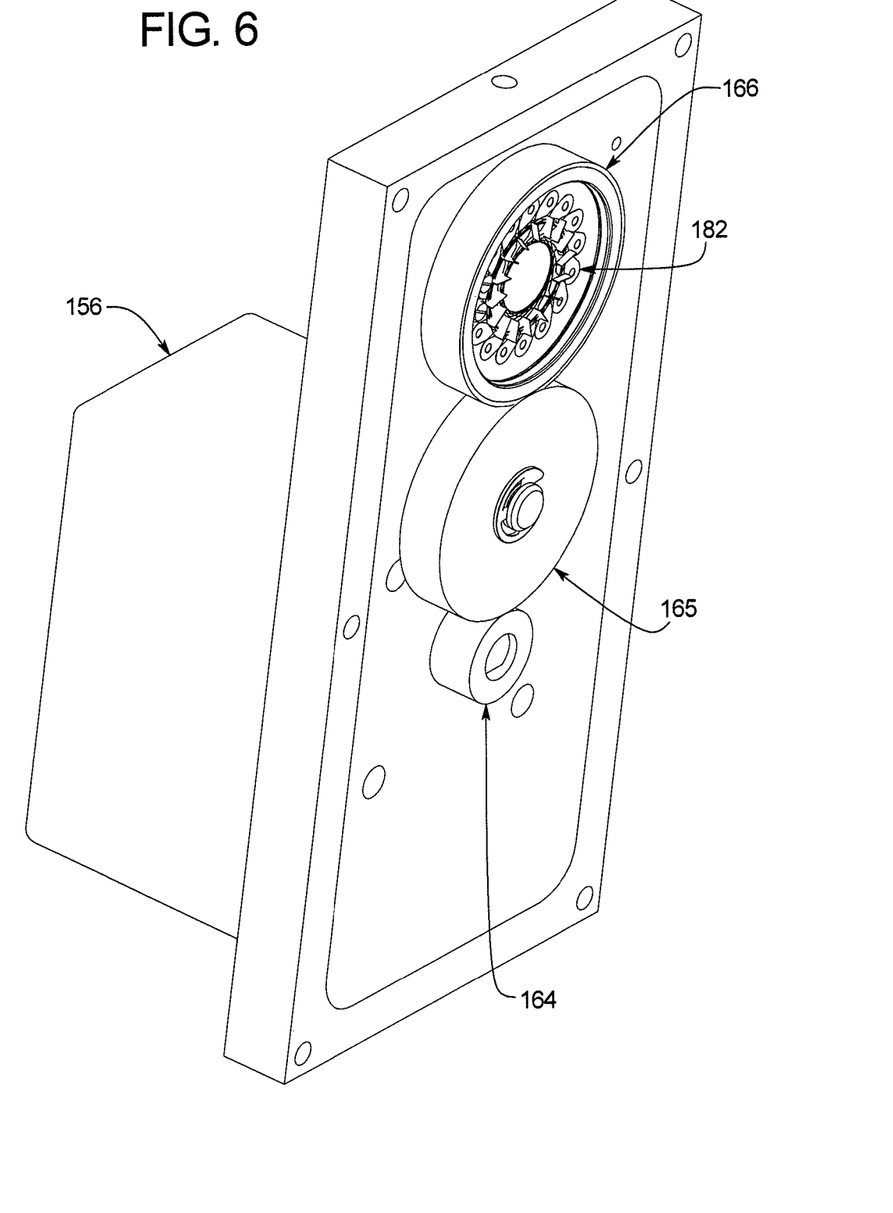
FIG. 6 is a partially disassembled isometric view of an alternate embodiment.

FIG. 6 depicts an alternate embodiment of the present invention. It includes a housing 156 supporting a drive gear 164 driven by a motor in the housing 156, which is obscured from view in the partially disassembled FIG. 6. As above, a main iris gear 166 has a plurality of leaves 182 mounted thereon. Gear 166 has an annular recess dimensioned to receive a bushing or extension (not shown in FIG. 6) having guide members such as slots for biasing the leaves 182 towards constriction or expansion in response to rotation of iris gear 166. In the embodiment depicted in FIG. 6, the driving force is transferred from drive gear 164 to iris gear 166 through transfer gear 165.

Figure 7:
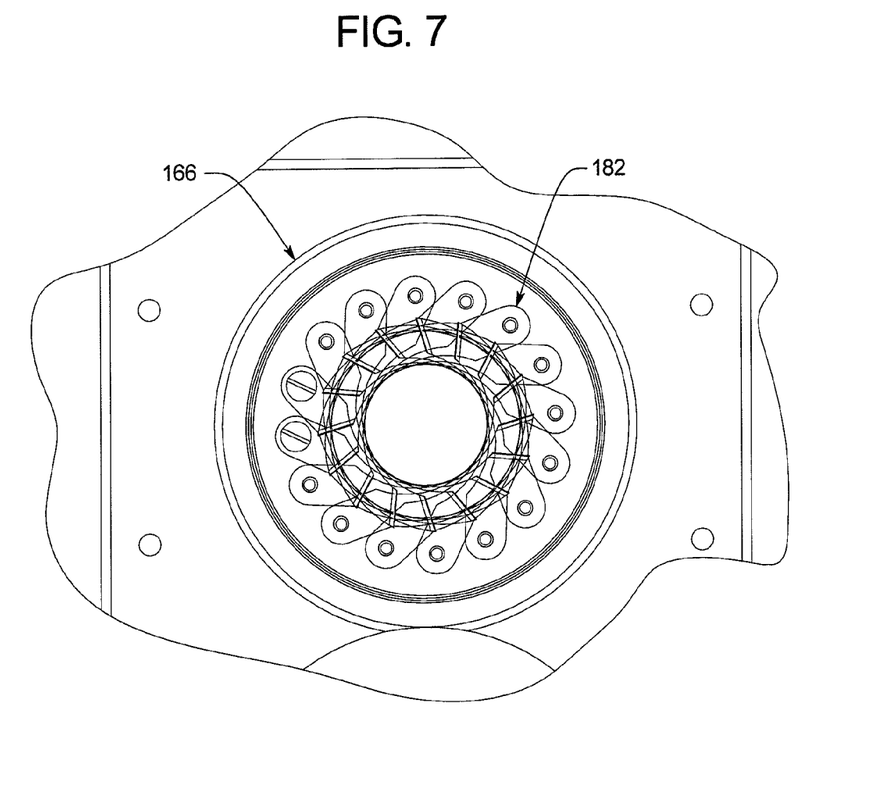
FIG. 7 is a partially disassembled cutaway top view of an alternate embodiment.

FIG. 7 is a top, partially disassembled, cutaway view of the iris gear 166, depicting the deployment of sixteen leaves 182.

Figure 8:
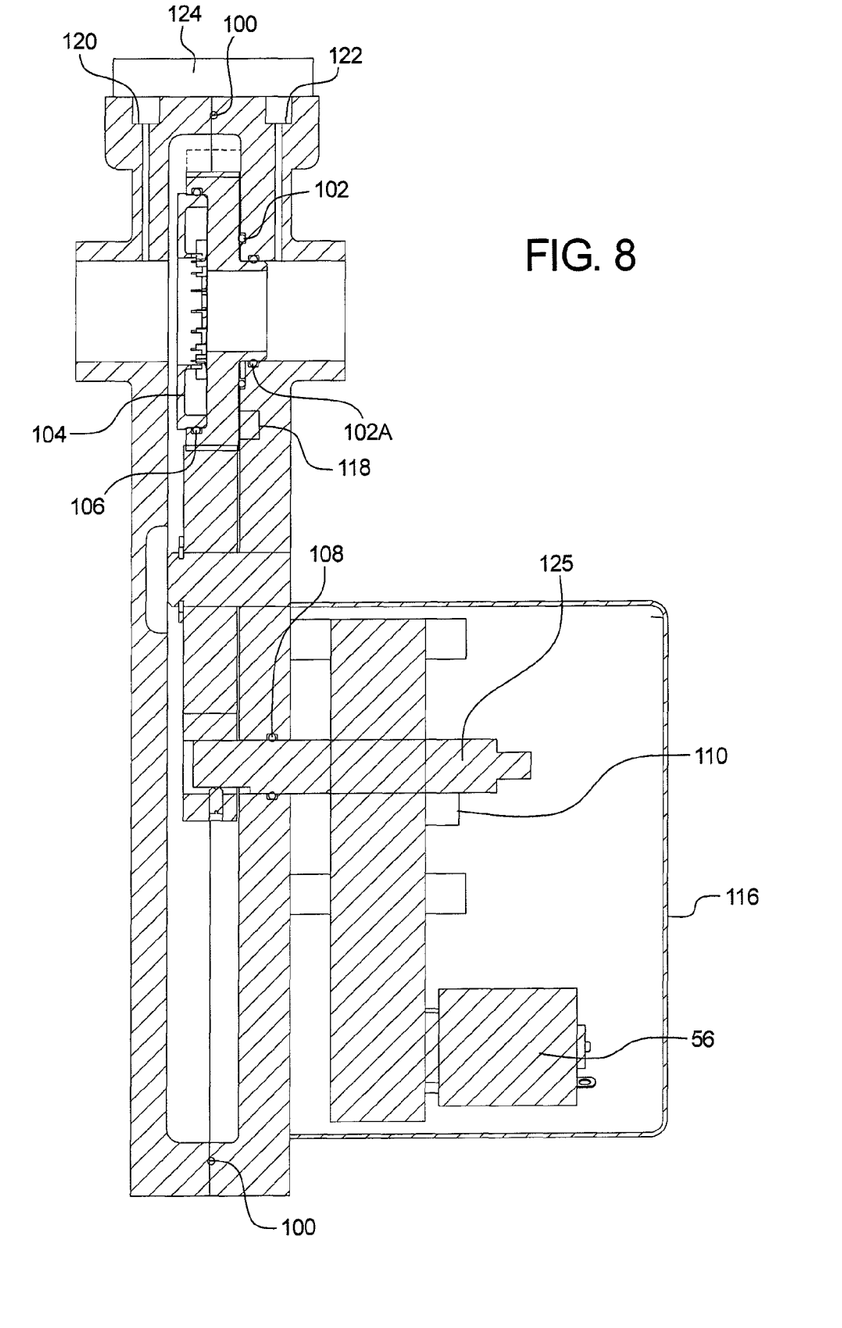
FIG. 8 is a cutaway side view of an alternate embodiment.

The sealing system is best seen in FIG. 8. The sealing system consists of several resilient gaskets, such as O-rings. The primary housing seal 100 is of a contoured shape, and rests within a groove in one of the housing plates. This seal engages the opposite housing plate when assembled. The fluid channel seal consists of two O-rings. One seal 102 (optionally, 102A) rests in a groove in the housing plate and engages the surface of the main iris gear 166 near the protruding boss. The other seal 104 rests in a groove in the other housing plate and engages the surface of the diaphragm guiding extension or bushing 168. There is also a seal 106 within the iris gear 166, which seals between the iris gear and the guide extension 168. The shaft sealing system consists of two O-rings that engage the drive motor shaft. One of these O-rings 108 rests in a groove inside of one of the housing plates. The other O-ring rests in a groove on the outside of one of the housing plates. All sealing system components are compressed when the mechanism is fully assembled.

Each housing plate 156 may also contain passages 120, 122 through which the differential pressure across the iris can be measured, either internally within the valve or through an external device. The valve may also contain an electronic differential pressure transducer which provides actual flow characteristic feedback. Also shown in FIG. 8 is a cam 110 for engaging limit switches as an optional control modality.

Figure 9:
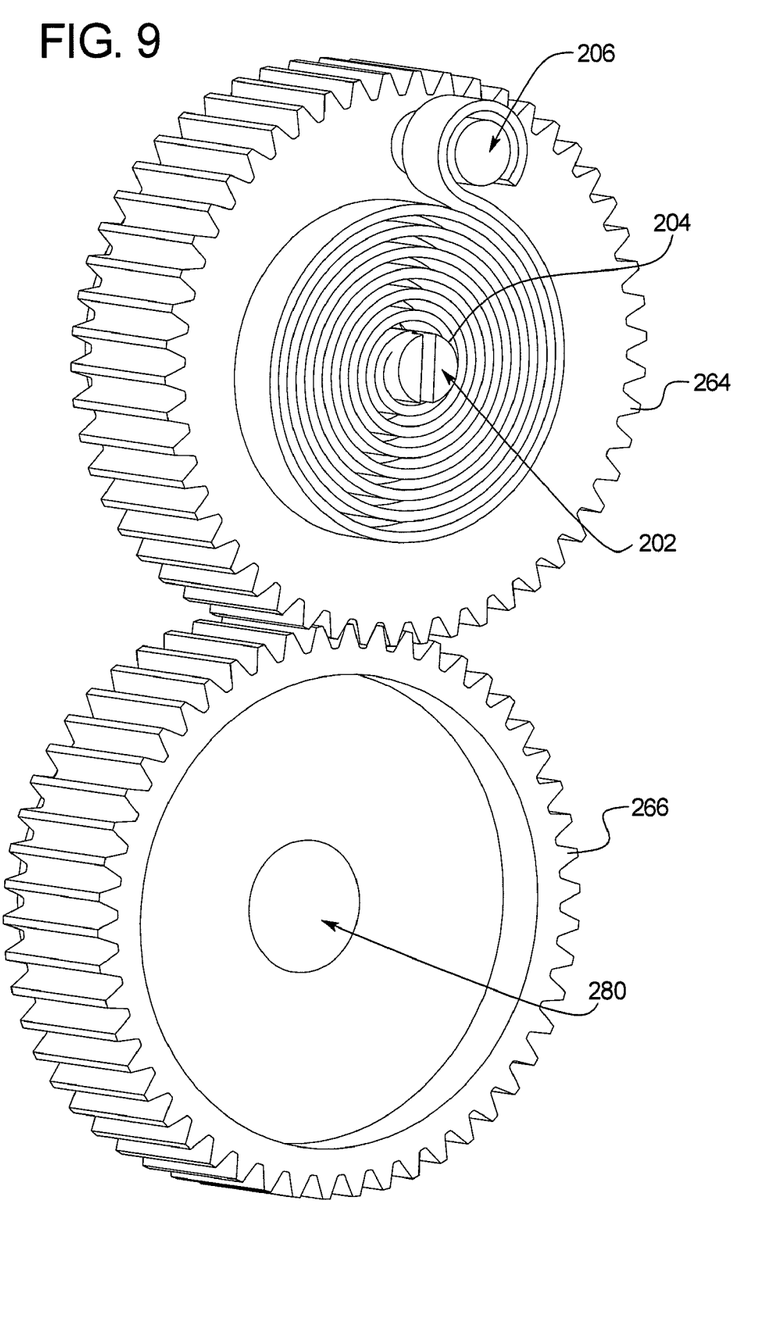
FIG. 9 is an isometric view of a second alternate embodiment.

FIG. 9 depicts an alternative embodiment of the present invention. In the depicted embodiment a bi-metal torsion spring drives the drive gear. Differential expansion and contraction of the two metals comprising the spring in response to temperature changes causes the metal strip to expand and contract rotationally, imparting drive when mounted as depicted. The center shaft 202 of drive gear 264 is fixed to the housing and remains stationary. The drive gear 264 is mounted to rotate around it. The internal end of bi-metal torsion spring 204 is fixedly attached to center shaft 202. Anchor shaft 206 is fixedly attached to or integrally formed with drive gear 264 at or near its outer edge. Bi-metal torsion spring 204 is attached at its outermost end to anchor shaft 206. Accordingly, expansion of bi-metal torsion spring 204 biases anchor shaft 206 and drive gear 264 in a first direction and contraction of bi-metal torsion spring 204 biases anchor shaft 206 in order to turn drive gear 264 in an opposing direction. As described hereinabove, rotation of drive gear 264 imparts counter rotation to the main or iris gear 266. Rotation of iris gear 266 opens and closes orifice 280.

Figure 10:
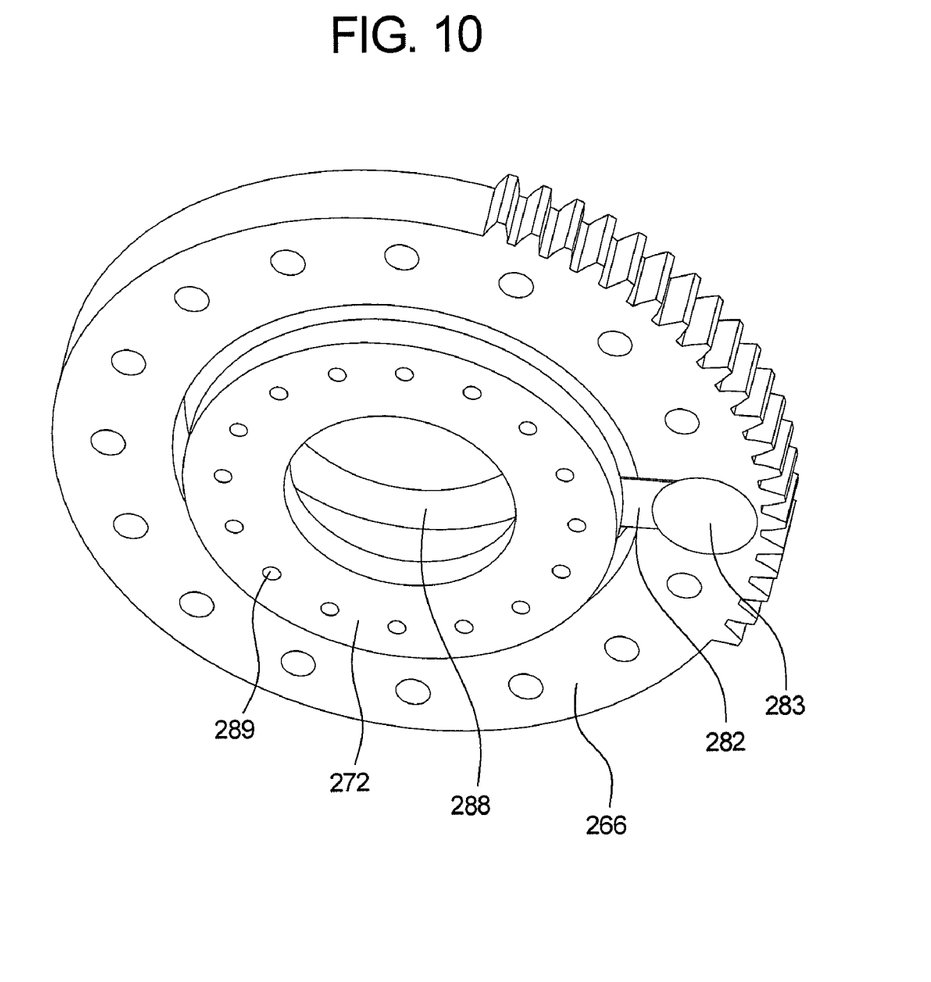
FIG. 10 is a first isometric view of a third alternate embodiment.
Figure 11:
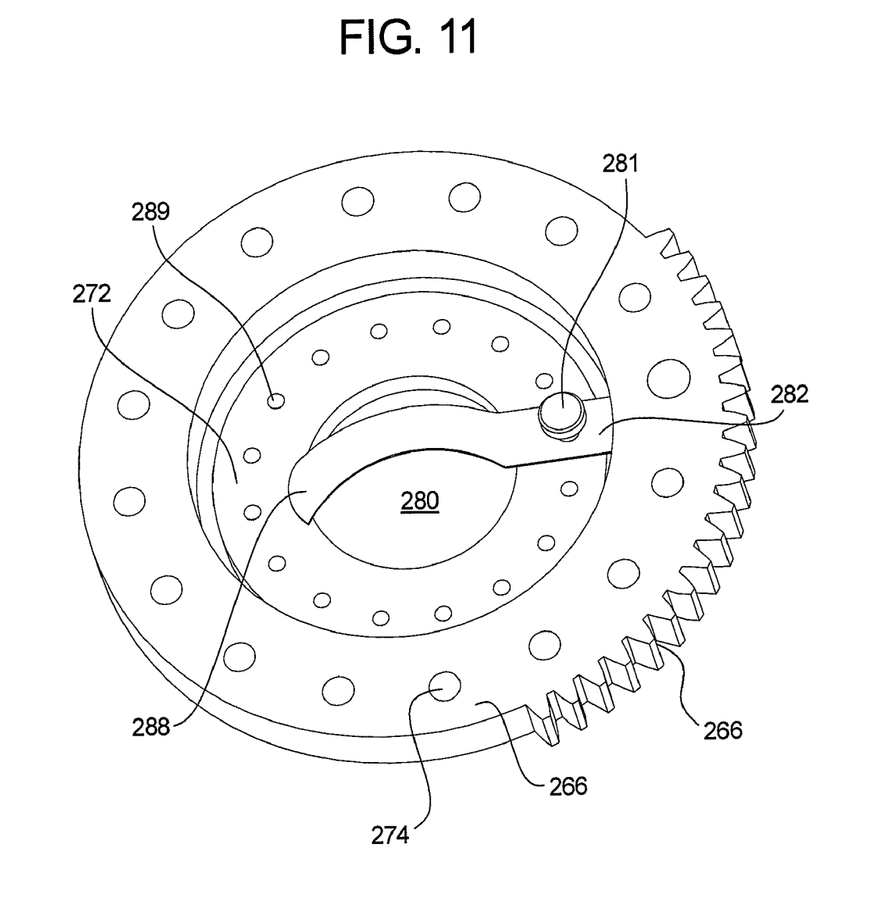
FIG. 11 is an opposing isometric view of the third alternate embodiment.

FIGS. 10 and 11 depict an alternate embodiment of the present invention. The drive gear 266 is driven through engagement of its teeth with the drive gear as described hereinabove. The iris leaves 282 are attached as before to pins 283, which are pivotally mounted in drive gear 266 in throughholes 274. In the embodiment depicted in FIGS. 10 and 11, the leaf 282 does not have a flange, vane or fin at its inner terminal end as in the previous embodiments (although it may be flared, twisted or otherwise non-planar in order to promote a sealing engagement with its neighboring leaves). Instead, the fixed valve mount includes an annular extension or bushing 272 that has a smaller diameter than the center hole of the drive gear 266 and extends axially into it. This annular extension 272 also has leaf engagement members that are pin holes 289 circumferentially spaced around its perimeter, which serve as mounts for pintels 287 which are pivotally engaged in the holes 289 and also through the leaves 282. Since the annular extension 272 is fixed, when the drive gear 266 rotates in either direction, the pivotal attachment of each leaf 284 to its drive gear pin 283 will cause the leaf 282 to be rotated in one direction or the other around inner pintel 287. Accordingly, the orifice extension 288 of each leaf will be rotated such that the orifice 280 will be opened or closed.

In the depicted embodiment, sufficiently wide tolerances are allowed in the pin 283—throughhole 274 and/or pin hole 289—pintels 287 relationships to allow opening and closing of orifice 280 despite the fixed coaxial relationship of iris gear 266 and extension 274.

The electrical control interface consists of multiple functional components. In one embodiment the main control interface consists of a sealed multi-pin plug. This plug may be wired to a printed circuit board. The PCB contains two DPDT relays which allow for switching of the polarity of the input drive signal. The primary PCB 101 also contains limit switches that indicate the valve position sensed from a mechanical positioning device attached to the secondary output shaft. The primary PCB may also contain limit switches which detect (as by cam 110) and control the travel limits of the drive system which can be positioned by a user. In one embodiment, a secondary PCB is wired to the primary PCB. The secondary PCB contains electronic control architecture which allows the reception, interpretation, and use of one of several standard control signals, such as 4-20 mA, 0-10 Vdc, etc. for valve position. The entire electronic control package may be physically contained within a protective cover 116, which is physically attached to one of the housing plates. There is a seal between the protective cover and the housing plate. There may also be indicators, which may be mechanical or electrical, on the housing which relay status of the valve position. There may also be a rotary position sensor 118 which provides valve position feedback to a supervisory control system.

The present invention provides for a mathematically predictable flow according to the equation:

$$\text{flow} = KA\sqrt{\frac{h}{g}},$$

in which K is a constant particular to the valve design. A is the area of the orifice, h is the pressure drop across the orifice, and g is the specific gravity of the fluid or gas flowing through it.

Figure 12:
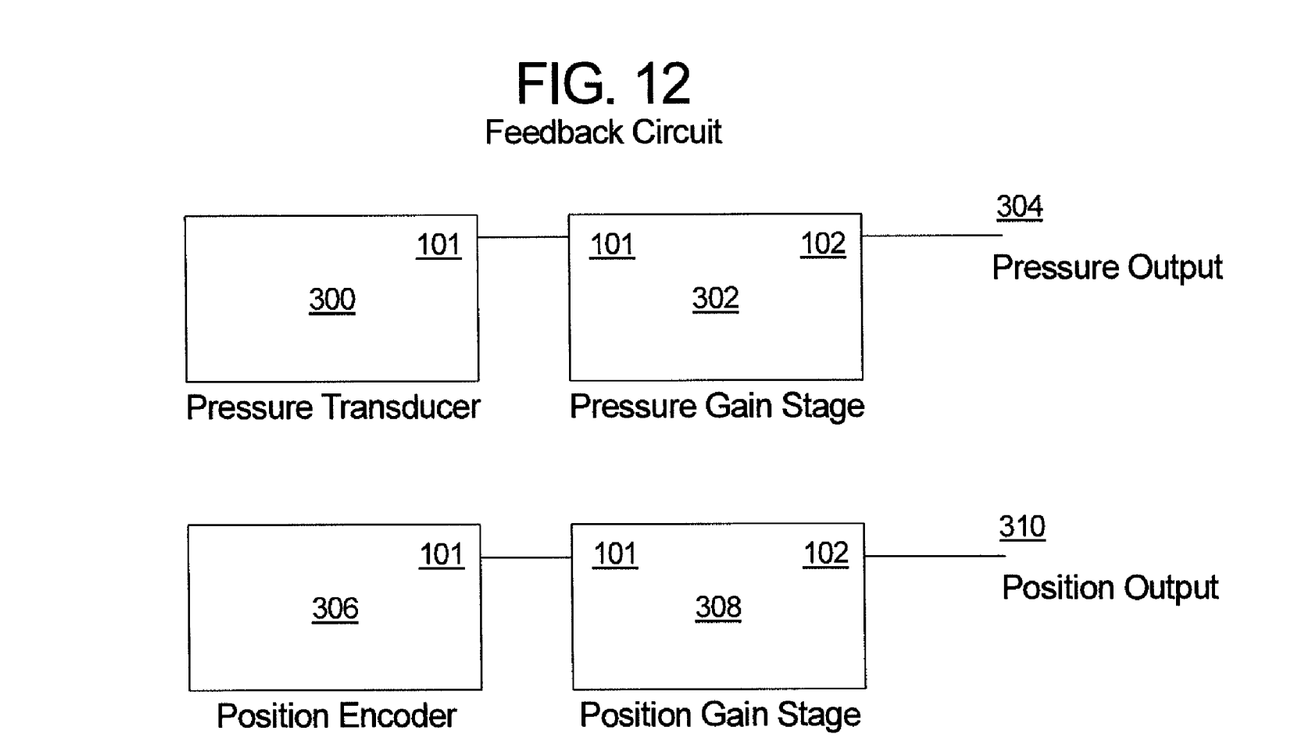
FIG. 12 is a circuit diagram of a novel feedback circuit for the present invention.

FIG. 12 depicts the novel feedback circuitry of the present invention. A pressure transducer 300 (see 124 in FIG. 8) is operatively engaged with pressure sensor port 120. The pressure transducer 300 signals a pressure gain stage 302 to yield a direct pressure reading output 304. Alternatively, a pressure differential output can be generated by incorporating a second pressure transducer operatively engaged to the second pressure sensor port 122 on the opposite of the valve orifice.

In order that the present invention may be incorporated into devices using an alternate control regimen, the feedback circuits also include a position encoder 306 operatively engaged with the drive train, usually at the motor shaft (see 125, FIG. 8). It too feeds into a position gain stage 308 in order to yield a position output 310. Such a position output 310 may be used with the equation $$\text{flow} = KA\sqrt{\frac{h}{g}},$$

in order to yield a cubic feet per hour corresponding to a percent that the valve orifice is open.

Thus, the present inventive mechanisms and controls provide greater precision for all gas or fluid control systems, including but not limited to trim gas flow in combination with protective atmospheric gas such as endothermic gas.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. In a fluid transmission line, a valve comprising: a housing, said housing establishing a lumen having an axial length for transmission of a fluid through said valve; a drive mechanism; a drive gear, said drive gear being mounted in said housing to be selectively driven in a first or second rotational direction by said drive mechanism, said drive gear having a central throughhole coaxial with an axis of said valve; a plurality of pins, said pins being circumferentially spaced around said central throughhole of said drive gear; a plurality of leaves, each of said leaves including a curvilinear portion and a pair of ends and being pivotally mounted on one of said pins at one of said ends, and each of said leaves being oriented to extend radially inward into said central throughhole; a fixed extension, said fixed extension having an annular aspect disposed in close cooperation with said throughhole of said drive gear, and said fixed extension having a plurality of engagement members, each of said engagement members being disposed to operatively engage one of said leaves at a position at the other of said ends of each of said leaves; said engagement members biasing said leaves to close an orifice when said drive gear rotates in said first direction and to open said orifice when said drive gear rotates in said second direction; and each of said leaves maintaining a substantially sealing engagement with each adjacent leaf throughout a range of motion of said plurality of leaves; wherein at least one of each of said leaves comprises a magnetic material and a respective adjacent leaf comprises a material attracted to the magnetic material for maintaining the substantially sealing engagement between said at least one of each of said leaves and said respective adjacent leaf throughout a range of motion of said at least one of each of said leaves and said respective adjacent leaf.

2. The valve of claim 1 wherein a laminar flow of a fluid passing through said orifice is reestablished within said axial length of said lumen.

3. The valve of claim 1 wherein said drive mechanism is a bi-metal leaf spring.

4. The valve of claim 1 wherein said drive mechanism is an electrical motor.

5. The valve of claim 1 wherein said orifice remains coaxial with said axis of said valve.

6. The valve of claim 1 further comprising at least one pressure sensor port located along said length of said valve.

7. The valve of claim 6 further comprising a second pressure sensor port located along said length of said valve and positioned on an opposite side of said orifice from said first pressure sensor port.

8. The valve of claim 1 wherein a volume throughput of fluid through said valve is proportional to an area of said orifice according to a continuous function.

9. The valve of claim 8 wherein said function is $$KA\sqrt{\frac{h}{g}},$$

where K is a constant, A is an area of an orifice, h is a pressure drop across the orifice, and g is a specific gravity of a fluid in the valve.

10. The valve of claim 1 wherein said engagement member of said fixed extension is a pintel, each of said leaves being rotatably engaged with each of said pintels.

11. The valve of claim 1 further comprising a controlled feedback circuit relating a size of said orifice to a fluid throughput volume.

12. The valve of claim 11 wherein said controlled feedback circuit is a position encoder.

13. The valve of claim 12 wherein said position encoder is operatively engaged with said drive mechanism.

14. The valve of claim 12 wherein said position encoder is related to a fluid volume throughput according to equation $$KA\sqrt{\frac{h}{g}},$$

where K is a constant, A is an area of an orifice, h is a pressure drop across the orifice, and g is a specific gravity of a fluid in the valve.

15. The valve of claim 11 wherein said feedback circuit comprises a pressure transducer operatively engaged with a pressure sensor port and configured to output a signal, said signal being preconfigured to correspond to a pressure of fluid.

16. The valve of claim 1 wherein said housing has sufficient sealing to direct all fluid flow through the diaphragm, allowing control of fluid flow.

17. The valve of claim 1 wherein said orifice remains substantially circular in substantially all diameters.

18. The valve of claim 1 further comprising an upstream pressure measurement port and a downstream pressure measurement port, each of said pressure measurement ports being within a housing of said valve.

19. The valve of claim 18 wherein said pressure measurement ports are integrally formed in a housing of said valve.

20. The valve of claim 1 wherein laminar flow of a fluid through said orifice is reestablished within a housing of said valve.

21. The valve of claim 1 wherein laminar flow is reestablished upstream of a downstream pressure measurement port.

22. The valve of claim 1 wherein when said leaves are in fully open position, said orifice is substantially equivalent in diameter to said lumen.

23. The valve of claim 1 wherein when said leaves are in fully open position, said orifice is at least as wide in diameter as a diameter of said throughhole defined by said fixed extension.

24. The valve of claim 1 wherein said valve orifice is controlled in response to a differential pressure between an upstream port and a down stream port.

25. In a fluid transmission line, a valve comprising: a housing, said housing establishing a lumen having an axial length for transmission of a fluid through said valve; a drive mechanism; a drive gear, said drive gear being mounted in said housing to be selectively driven in a first or second rotational direction by said drive mechanism, said drive gear having a central throughhole coaxial with an axis of said valve; a plurality of pins, said pins being circumferentially spaced around said central throughhole of said drive gear; a plurality of leaves, each of said leaves having a curvilinear portion and a pair of ends and being pivotally mounted on one of said pins at one of said ends, and each of said leaves being oriented to extend radially inward into said central throughhole; a fixed extension, said fixed extension having an annular aspect disposed in close cooperation with said throughhole of said drive gear, and said fixed extension having a plurality of engagement members, each of said engagement members being disposed to operatively engage one of said leaves at a position at the other of said ends of each of said leaves; said engagement members biasing said leaves to close an orifice when said drive gear rotates in said first direction and to open said orifice when said drive gear rotates in said second direction; said orifice remaining substantially circular in substantially all diameters; at least one of said leaves being nonplanar in a degree sufficient to sealingly engage at least one adjoining leaf, such that each of said leaves maintains a substantially sealing engagement with each adjacent leaf throughout a range of motion of said plurality of leaves; a first pressure sensor port located along said length of said valve; and a second pressure sensor port located along said length of said valve and positioned on an opposite side of said orifice from said first pressure sensor port such that a pressure differential may be measured; wherein a laminar flow of a fluid passing through said orifice is reestablished within said axial length of said lumen; wherein at least one of each of said leaves comprises a magnetic material and a respective adjacent leaf comprises a material attracted to the magnetic material for maintaining the substantially sealing engagement between said at least one of each of said leaves and said respective adjacent leaf throughout a range of motion of said at least one of each of said leaves and said respective adjacent leaf.

\* \* \* \* \*